United States Patent Office 2,727,022
Patented Dec. 13, 1955

2,727,022

PROCESS FOR POLYMERIZING ISO-OLEFIN POLYMERS WITH ISOPENTANE DILUENT

Jack Linsk, Hammond, Ind., assignor to Standard Oil Company, Chicago, Ill., a corporation of Indiana No Drawing. Application April 16, 1952,
Serial No. 282,707

2 Claims. (Cl. 260—94.8)

This invention relates to the polymerization of iso-olefins and to the copolymerization of iso-olefins and diolefins. More particularly, the invention relates to the reaction medium in which the polymerization is normally carried out.

Iso-olefins such as isobutylene, isopentenes and iso-hexenes can be polymerized to produce materials ranging from liquids to solids. Also, iso-olefins can be copolymerized with diolefins such as butadiene and isoprene to produce solids which have elastic rubbery characteristics. In order to produce materials of high enough molecular weight to be useful as viscosity index improvers, elastomers, synthetic rubbers, etc., it is necessary to carry out the polymerization reaction at temperatures below about 0° C.; when solid materials having rubbery characteristics are desired, the polymerization reaction is normally carried out below about −50° C. The polymerization reaction is carried out in the presence of a catalyst such as $AlCl_3$, $BF_3$, etc. Usually the reaction is carried out in the presence of an inert material which serves as a diluent for the reactant(s) and the catalyst, and which does not participate in the reaction. Examples of these diluents are ethylene, propane, butane, pentane, hexane, various alkyl halides, perfluorinated hydrocarbons, etc. One of the chief items in this process is the cost of refrigeration, whether the cooling is obtained by the use of an internal refrigerant such as ethylene or propane, or by external means. Normally high molecular weight material is desired. The art has striven to obtain these high molecular weights at the highest possible reaction temperatures.

An object of this invention is the polymerization of iso-olefins. Another object of the invention is the preparation of high molecular weight isobutylene polymers. Still another object of the invention is an isoolefin polymerization process wherein the polymerization reaction takes place in the presence of $AlCl_3$ catalyst and a particular inert diluent. A specific object of the invention is the preparation of iso-olefin polymers at temperatures above those now required to produce polymers of the same molecular weight. Other objects will be apparent in the detailed description of the invention.

The inert diluent present in the polymerization zone has a considerable effect on the molecular weight of the product. It has been discovered that for $AlCl_3$ catalyst, highest molecular weight products are obtained when the inert diluent comprises essentially isopentane. It is to be understood that the isopentane of this invention includes not only the substantially pure hydrocarbon, but also the commercial grades of this hydrocarbon, e. g., commercial grade isopentane may contain as much as 10 volume percent or more of hydrocarbon materials other than the desired isopentane. Although the results obtainable when using isopentane containing substantial amounts of other paraffinic material, i. e., less than about 10%, are not as good as those obtainable when using the essentially pure isopentane, the commercial grade materials are within the scope of the invention.

While the amount of the diluent which must be present in the polymerization zone is dependent upon the type of iso-olefin and the reaction conditions, in general it has been found that between about 20 and 1,000 volume percent, based on iso-olefin, is a suitable amount. A sufficient amount of diluent should be present to dissolve the product polymer. It is preferred to use between about 100 and 500 volume percent of diluent.

The yield of high molecular weight polymer is dependent somewhat on the amount of $AlCl_3$ catalyst introduced into the contacting zone. The amount of $AlCl_3$ present in the contacting zone may be as little as 0.05 weight percent or less, and as much as 10 weight percent or more, based on iso-olefin present in the contacting zone. In general, it is preferred to use from about 0.1 to about 5 weight percent of $AlCl_3$.

The catalytic effect of $AlCl_3$ decreases as the temperature of the polymerization zone is lowered. This is believed to be the result of the decreased solubility of $AlCl_3$ in the iso-olefin feed and inert hydrocarbon diluent. This characteristic of $AlCl_3$ has been overcome by the use of a preformed solution of $AlCl_3$ in an alkyl halide, particularly alkyl halides containing from 1 to 4 carbon atoms. By the use of a preformed solution of $AlCl_3$ and an alkyl halide such as methyl chloride or ethyl chloride, it is possible to operate at temperatures as low as −150° C. to produce very high molecular weight polymers and copolymers in excellent yield. The alkyl halide should not only have a very high dissolving power for the $AlCl_3$, but also should have a freezing point at about or preferably below the reaction temperature. When operating with large amounts of hydrocarbon diluent, alkyl halides having a freezing point somewhat higher than the reaction temperature may be utilized. The alkyl halides which contain from 1 to 4 carbon atoms are particularly suitable. It is preferred to use alkyl chlorides containing from 1 to 2 carbon atoms, i. e., methyl chloride and ethyl chloride. The amount of alkyl halide used is not critical as long as all of the $AlCl_3$ catalyst is soluble therein. In general, control of the operation is easier when relatively dilute solutions of $AlCl_3$ in alkyl halide are used.

The catalyst is adversely affected—poisoned—by many sulfur-containing and oxygen-containing organic compounds. Alcohols, ketones and water are particularly objectionable.

In order to obtain products having a molecular weight suitable for uses such as high V. I. lube oils, it is necessary to carry out the polymerization reaction at a temperature below about 0° C.; in general the preferred operating temperature will be below about −20° C. As the reaction temperature is lowered, the molecular weight of the product is increased until at a temperature of about −150° C. molecular weight in excess of 500,000 is obtained. The usual range of reaction temperatures for the production of solid polymers is between about −20° C. and −110° C. It is particularly desirable to carry out the reaction at a temperature below about −50° C. when the iso-olefin feed stock contains appreciable amounts of normal-olefins. The presence of n-olefins such as n-butenes and n-pentenes has a deleterious effect on the molecular weight of the product, which effect can be overcome in part by lowering the temperature of the polymerization zone.

The feed to this process may be any iso-olefin, but preferably one having not more than 6 carbon atoms, or the feed may be a mixture of iso-olefin and diolefin to produce a copolymer. The preferred diolefins are butadiene and isoprene. The preferred iso-olefin is isobutylene.

The results obtainable by this process are illustrated by several examples. It is to be understood that these examples are illustrative only and do not limit the scope of the invention. The experiments were carried out in a glass 3-neck flask provided with a motor-driven stirrer and a thermometer. The inert diluent was added to the flask and the flask and contents were brought to the desired temperature by external cooling. A weighed amount of the polymerization feed was then added to provide the sample. A definite amount of $AlCl_3$ was added to the flask in several small portions. Usually each addition of catalyst resulted in a rise in temperature of the reaction mixture. This rise in temperature was noted. The contents of the flask were stirred for a given time and then the reaction was quenched by adding methanol. The diluent was evaporated and the residual material in the flask was dissolved in hexane. The hexane solution was washed with water and dried over calcium chloride. An aliquot was concentrated in vacuo at 100° C. to determine polymer yield. Intrinsic viscosities were determined on samples dissolved in diisobutylene. The molecular weights referred to herein were obtained by the intrinsic viscosity method described by Flory—J. Am. Chem. Soc. 65, 372 (1943).

Examples

In each of these tests 100 g. of high purity isobutylene were used as the feed and 400 g. of inert diluent were used. All the tests were run at the same temperature of —34° C. and at the same catalyst usage of 1.5 g. of powdered $AlCl_3$. The data obtained are tabulated below:

| Test | Diluent | Reaction Time, Min. | Polymer Yield, Wt. Percent | M. W. |
|---|---|---|---|---|
| 1 | n-butane (Tech.) | 45 | 87 | 98,000 |
| 2 | isobutane [1] | 60 | 65 | 79,000 |
| 3 | n-pentane [1] | 60 | 100 | 73,000 |
| 4 | isopentane [1] | 60 | 97 | 137,000 |
| 5 | do [1] | 60 | 93 | 130,000 |

[1] High purity.

It is considered that tests 4 and 5 are in good agreement.

The polymerization occurs promptly on addition of catalyst and can be conducted either in a succession of batch reactions or in a continuous reaction. In either case, the polymer is preferably recovered by discharging the polymerized material, usually at conversions ranging from 70 to 95% based on monomers, into a flash tank containing warm water which kills the catalyst, volatilizes out the unpolymerized monomers and diluent, and converts the polymer from a slurry in cold reaction mixture into a slurry in warm water. Various slurry stabilizers and polymer stabilizers may be added to the flash tank. The polymer is then recovered by a straining operation followed by drying and hot milling.

It has also been discovered that iso-olefin polymers of exceptionally high molecular weight can be obtained under the operating conditions specified above by using an inert hydrocarbon diluent comprising a cycloparaffin which does not contain any tertiary hydrogen atoms (including dialkylcycloparaffin of the "gem" type). A preferred cycloparaffin is a high purity cyclopentane; commercial grade cyclopentane is also effective.

Thus having described the invention, what is claimed is:

1. A process which comprises contacting a feed consisting essentially of isobutylene with an aluminum chloride catalyst in the amount of between about 1 and about 2 weight percent, based on feed, at a temperature of about —35° C. over a time of about 1 hour, in the presence of an inert diluent consisting essentially of isopentane, in an amount between about 100 and 500 volume percent, based on feed, and recovering a solid polymer from the reaction product mixture.

2. A process which comprises contacting high purity isobutylene with about 1.5 weight percent of finely powdered aluminum chloride catalyst at a temperature of —34° C. over a period of 60 minutes, in the presence of 400 volume percent, based on isobutylene, of high purity isopentane, and recovering a solid polymer from the reaction product mixture.

References Cited in the file of this patent

UNITED STATES PATENTS

| 2,516,683 | Dornte | July 25, 1950 |
| 2,583,420 | Garber et al. | Jan. 22, 1952 |

OTHER REFERENCES

Flory: J. Am. Chem. Soc., 65, 372, 378 (March 1943).

Zapp et al.: Ind. Eng. Chem., 38, 948, 949 (September 1946).

Mellon: "Industrial Solvents," Reinhold (1950), page 255.